US011199361B2

(12) United States Patent
Chudnovsky et al.

(10) Patent No.: US 11,199,361 B2
(45) Date of Patent: Dec. 14, 2021

(54) METHOD AND APPARATUS FOR NET ZERO-WATER POWER PLANT COOLING AND HEAT RECOVERY

(71) Applicant: GAS TECHNOLOGY INSTITUTE, Des Plaines, IL (US)

(72) Inventors: Yaroslav Chudnovsky, Skokie, IL (US); Aleksandr Kozlov, Buffalo Grove, IL (US); Dmytro Buyadgie, Odessa (UA); Olexiy Buyadgie, Pleasant Hill, CA (US); Oleksii Drakhnia, Odessa (UA)

(73) Assignee: GAS TECHNOLOGY INSTITUTE, Des Plaines, IL (US)

( * ) Notice: Subject to any disclaimer, the term of this patent is extended or adjusted under 35 U.S.C. 154(b) by 0 days.

(21) Appl. No.: 16/791,767

(22) Filed: Feb. 14, 2020

(65) Prior Publication Data
US 2020/0263927 A1     Aug. 20, 2020

Related U.S. Application Data (60) Provisional application No. 62/807,587, filed on Feb. 19, 2019.

(51) Int. Cl.
| F28B 9/00 | (2006.01) |
| F28B 1/02 | (2006.01) |
| F01K 19/10 | (2006.01) |
| F01K 11/00 | (2006.01) |

(52) U.S. Cl.
CPC ............... *F28B 9/00* (2013.01); *F01K 11/00* (2013.01); *F01K 19/10* (2013.01); *F28B 1/02* (2013.01)

(58) Field of Classification Search
CPC .... F28B 9/00; F28B 1/02; F01K 19/10; F01K 11/00; F01K 9/003; F01K 23/10
See application file for complete search history.

(56) References Cited

U.S. PATENT DOCUMENTS

| 3,814,177 A | 6/1974 | Harris et al. |
| 5,271,216 A | 12/1993 | Frutschi et al. |
| 5,417,053 A | 5/1995 | Uji |

(Continued)

FOREIGN PATENT DOCUMENTS

| WO | WO 95/24822 | 9/1995 |

OTHER PUBLICATIONS

U.S. Patent Office, English language version of the International Search Report, Form PCT/ISA/210 for International Application PCT/US2020/018721, Sep. 21, 2020 (3 pages).

(Continued)

*Primary Examiner* — Shafiq Mian
(74) *Attorney, Agent, or Firm* — Pauley Erickson & Swanson (57) ABSTRACT

A method and system for heat recovery and/or power plant cooling, incorporating an ejector configured to transfer vapor from a generator to a condenser. The ejector includes a converging-diverging nozzle to create a low pressure zone that entrains a fluid. The ejector is within a cooling fluid cycle line in heat exchange combination with an exhaust flue gas. Two fluid flows of the fluid cycle line are mixed via the ejector into a combined fluid, wherein the ejector adjusts a temperature and/or pressure of the combined fluid. Condensing the combined fluid provides a cooling medium.

22 Claims, 8 Drawing Sheets

(56) References Cited

U.S. PATENT DOCUMENTS

| | | | |
|---|---|---|---|
| 5,442,906 | A | 8/1995 | Broadus |
| 7,545,644 | B2 | 6/2009 | Fedorov |
| 8,572,973 | B2 | 11/2013 | Li et al. |
| 8,667,899 | B2 | 3/2014 | Kipping |
| 2010/0206530 | A1 | 8/2010 | Schmidt |
| 2011/0289951 | A1 | 12/2011 | Furlong et al. |
| 2012/0255304 | A1* | 10/2012 | Li .................... F01K 17/02 60/670 |
| 2012/0304617 | A1* | 12/2012 | Kipping ............ F01K 15/02 60/39.182 |
| 2015/0369125 | A1* | 12/2015 | Reiter ............... F01K 13/02 60/775 |
| 2017/0175589 | A1* | 6/2017 | Balczunas .......... F22D 1/02 |

OTHER PUBLICATIONS

U.S. Patent Office, English language version of the Written Opinion of the ISA, Form PCT/ISA/237 for International Application PCT/US2020/018721, Sep. 21, 2020 (11 pages).

Ken Mortensen, "Improved Performance of an Air Cooled Condenser (ACC) Using SPX Wind Guide Technology at Coal-Based Thermoelectric Power Plants." Mar. 31, 2011 (46 pages).

John S. Maulbetsch, "Water Conserving Cooling Systems—Air-cooled Condensers-", ARPA-E Workshop, Mar. 28, 2012 (31 pages).

\* cited by examiner

METHOD AND APPARATUS FOR NET ZERO-WATER POWER PLANT COOLING AND HEAT RECOVERY

CROSS REFERENCE TO RELATED APPLICATION

This application claims the benefit of U.S. Provisional Application, Ser. No. 62/807,587, filed on 19 Feb. 2019. The co-pending provisional application is hereby incorporated by reference herein in its entirety and is made a part hereof, including but not limited to those portions which specifically appear hereinafter.

BACKGROUND OF THE INVENTION

Field of the Invention

The invention is related to energy and/or water recovery from exhaust streams of thermal or nuclear power plants for efficiency improvement, reducing GHG and other pollutant emissions, and/or for avoiding any associated ancillary plant-generated power consumption.

Most of the conventional thermoelectric power plants (~99%) use a substantial amount of water to condense steam from the power turbine exhaust. Replacing wet cooling with dry cooling technologies (such as an Air-Cooled Condenser (ACC)) saves water but increases capital cost and reduces the electrical output of the power plant by 2-10% depending on climate zone, flue gases parameters and environmental conditions. There is a continuing need to improve energy and/or water recovery from exhaust streams of power plants or other industrial processes.

Summary of the Invention

The present invention uses water vapor in the exhaust of, for example, a fossil fuel (coal- or gas-) fired power plant to cost-effectively increase the airside heat transfer coefficient by ambient air pre-cooling and/or thin-film evaporative enhancement at the ACC convective surfaces. This approach provides improvements such as: increase in air-side heat transfer coefficient (some proven technologies claim significant (several orders of magnitude) heat transfer coefficient increase); no fresh water withdrawal for the cooling purposes because condensed water from the plant exhaust precools the ambient air and enhances the air-side cooling; low or no loss in power output associated with the cooling system (the waste heat and a portion of the heat of condensed steam serve as a driving force for simple ejector systems to generate the cooling capacity for both ultra-efficient condensing of the exhaust and for electrical power co-generation needed for the ACC fans and pumps); and/or LCOE does not rise because the dry cooling system will have a smaller footprint and higher efficiency.

Exergy of the low-grade waste heat is utilized in the invention to generate additional power for system operation and for assisting the condensation process of the bottoming cycle in case of combined cycle power plant (as one of the preferred embodiments). Currently this exergy is not utilized due to lack of cost-effective solutions at the marketplace and dissipated into the ambient environment. Intermediate heat exchangers serve to evaporate water and refrigerant at the high pressure, generating surplus electric power and cooling capacity respectively. Condensation of water vapor from the flue gas by cooling it to the dew point level occurs simultaneously, followed by condensate storage and its utilization for heat transfer process intensification at the bottoming cycle to the point of complete heat rejection into the ambient.

Embodiments of the invention include a method for heat recovery and/or power plant cooling, including steps of: providing a fluid cycle line in heat exchange combination with an exhaust flue gas, the fluid cycle including an ejector within the fluid cycle line; mixing two fluid flows of the fluid cycle line into a combined fluid within the ejector, wherein the ejector adjusts a temperature and/or pressure of the combined fluid; and condensing the combined fluid to provide a cooling medium. The method can further include generating power from a steam turbine in combination with the fluid cycle line, such as for powering the method and system of this invention.

In embodiments of this invention, the cooling medium is divided into a first flow and a second flow. A first vapor supply is generated from the cooling medium of the first flow, and a second vapor supply, such as at a different temperature and/or pressure, is generated from the cooling medium of the second flow. The first vapor supply and the second vapor supply are entrained within the ejector to change, or otherwise combine, the temperature and/or pressure for further work and/or to provide a cooling condensate.

Embodiments of this invention further includes a second refrigerant cycle line with a second ejector. The refrigerant can be any suitable material, such as water or other coolant. Two refrigerant fluid flows of the second refrigerant cycle line are mixed into a combined refrigerant within the second ejector, wherein the second ejector adjusts a temperature and/or pressure of the combined refrigerant. The fluid cycle line and the second refrigerant line can extend through a shared component, for example, a condenser such as a generator-condenser or a condenser evaporator. The shared condenser can lower a temperature of a second refrigerant flow, and can be used for entraining a vapor-gas mixture within the second ejector.

The invention further includes a method for heat recovery and/or power plant cooling with steps of: cooling combustion products having a temperature above ambient in a generator-condenser to generate a high-pressure vapor; expanding the vapor in a nozzle of an ejector to entrain a mixture with a second vapor from a condenser or evaporator; flowing the mixture through a diffuser of the ejector to compress; and heating and directing the mixture to a turbine. The heated mixture can be used to power condenser fans and water pumps of the system, with any power excess directed to a local grid. The mixture can be directed from the vapor-gas turbine to the condenser, wherein the water vapor is condensed and cooled to a temperature below the ambient.

In embodiments of the invention the cooling further includes steps of: heating and/or evaporating the vapor in the generator-condenser; entraining the vapor and the second vapor in an entrained mixture; and compressing the entrained mixture and directing the compressed entrained mixture to a condenser to obtain a refrigerant condensate. The method can further include a step of dividing the refrigerant condensate into a first flow and a second flow, wherein the first flow is directed to the evaporator and the second flow is directed to the generator-condenser.

The invention further includes a system for heat recovery and/or power plant cooling. The system includes a vapor generator configured to receive combustion products, and an ejector configured to transfer vapor (e.g., a steam-air mixture (humidified air)) from the generator to a condenser. The ejector desirably includes a converging-diverging nozzle to create a low pressure zone that entrains a fluid. The system further includes a cooling cycle line (e.g., a refrigerant line) in combination with the vapor generator, which includes a second ejector configured to transfer a second fluid from the vapor generator to a second condenser.

DETAILED DESCRIPTION OF THE DRAWINGS

Embodiments of this invention include an ejector-based condensing for deep recovery of water vapor from utility exhaust, and/or a waste heat driven low-cost turbo-ejector system for supplemental co-generation to provide energy (up to 40 MW) to power the proposed dry cooling system including, fans, pumps valves and/or controls. The invention provides a cost-effective waste heat driven co-generation to compensate the power consumption by turbo-ejectors and the supplemental cooling system.

Figure 1:
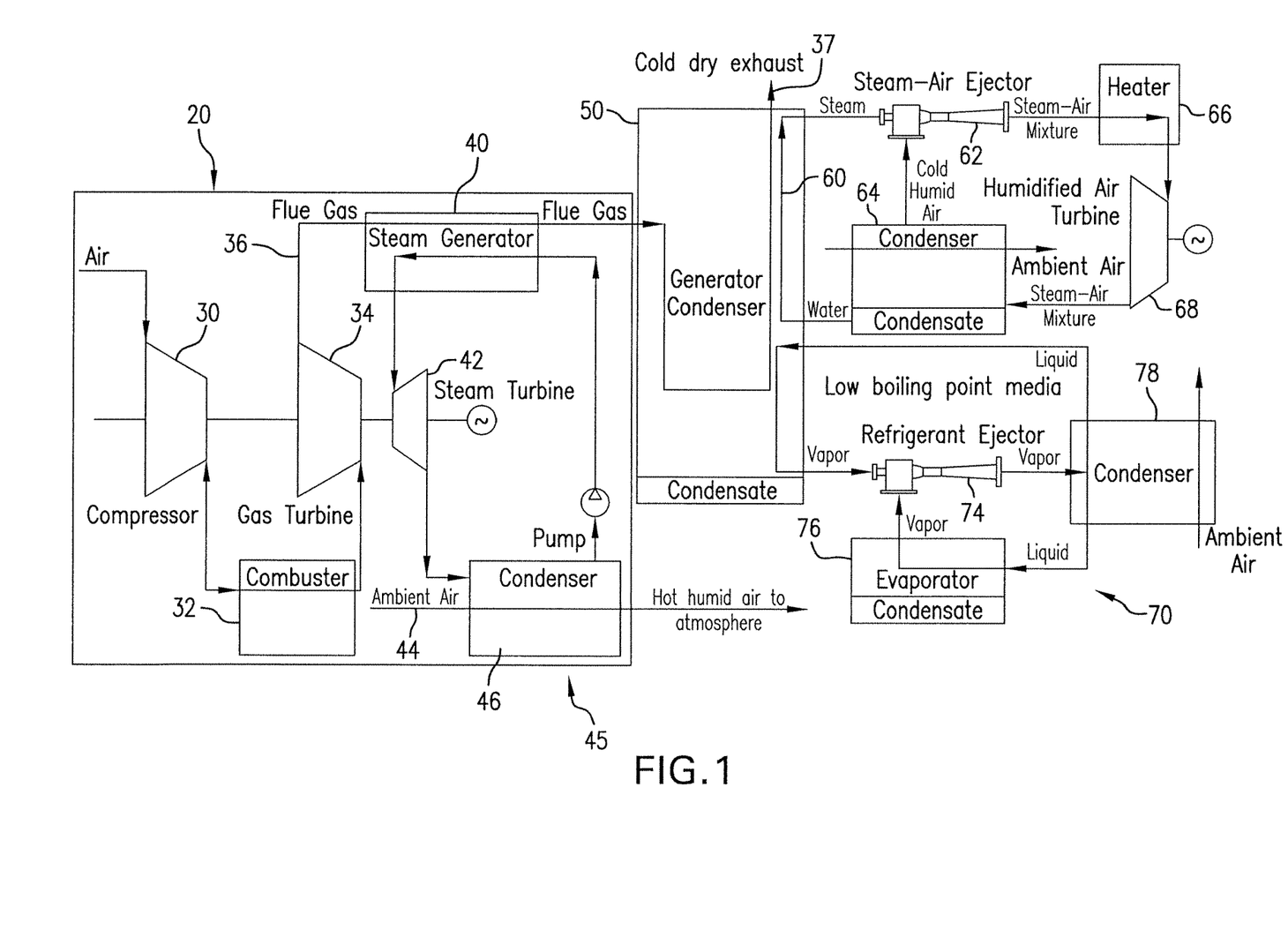
FIG. 1 is a flow diagram showing power plant cooling and/or heat recovery according to one embodiment of this invention.

FIG. 1 illustrates a combined cycle power plant that uses a combination of steam turbine (low pressure steam at the turbine outlet) and a gas turbine (gaseous combustion product at the turbine outlet).

Embodiments of this invention, such as shown in FIG. 1, include two integrated closed-loop ejector-based systems. One system provides a deep condensing of the utility exhaust to obtain enough condensed water for dramatic increase of the heat transfer coefficient at the air-side of conventional ACCs (for example ACC with structurally advanced surfaces and thin-film evaporative enhancement) without any pressure, cost, or power output penalties. The other ejector-based system is intended for co-generation to make up the energy required to power the entire dry cooling network (fans, pumps, controls). Both systems are driven by waste heat from the same utility exhaust otherwise rejected to the environment.

Referring to FIG. 1, a combined cycle power plant 20 includes an air compressor 30 in combination with a combustor 32 and a gas turbine 34. Flue gas 36 from the gas turbine 34 heats a fluid (e.g., a liquid such as water) in steam generator 40, which powers steam turbine 42. Ambient air 44 is used to cool the steam in condenser 46, and the fluid is pumped back to the steam generator 40 in a closed cycle 45.

In the embodiment of the invention illustrated in FIG. 1, combustion products of the flue gas 36 having a temperature above the ambient are cooled in a generator-condenser 50, where a high-pressure steam is generated. The heat transfer from the flue gas 36 to a fluid flow of fluid cycle line 60 cools the flue gas into a cool, dry exhaust 37. The generator-condenser 50 creates a gas or vapor in the fluid cycle line 60, which is then expanded in an ejector 62, which entrains a vapor-gas (e.g., humid-air) mixture from the condenser 64. The mixed fluid flows through the ejector's diffuser, where it is compressed and directed via a heater 66 (e.g., superheater) to a vapor-gas turbine 68 of a turbo-ejector power cycle. The superheated mixture is expanding with useful work output for powering of multiple condensers' fans and/or water pumps. Power excess can be directed to the local grid. After the vapor-gas turbine 68, the expanded mixture is directed to the condenser 64, where water vapor (e.g., steam) is condensed by the ambient. Additionally or alternatively, refrigerant, evaporating in a refrigerant vapor generator of an ejector refrigerating system 70 can assist the water vapor condensation. However, a main purpose of this embodiment is to cool the water condensate from the flue gas to the temperature below ambient in order to intensify the heat rejection from the bottoming cycle by spraying this cold condensate on the condenser's fins or other enhanced surfaces to adequately balance the heat transfer rates inside and outside of the condenser's tubes.

In FIG. 1, the cooling processes in the ejector refrigerating system 70 is started when, for example, a high pressure refrigerant in second cycle line 72, evaporated by flue gases in the generator-condenser 50 or in a separate vapor generator heated by the flue gases after the generator-condenser 50, is expanded in the refrigerant ejector's nozzle 74. After expansion this refrigerant vapor (motive or primary flow) entrains the vapors from evaporator (entrained or secondary flow) 76, is compressed, and directed to condenser 78. The refrigerant condensate is split into two flows: one is throttled back to the evaporator 76 to produce cooling capacity at low-pressure evaporation, and the other is pumped to the generator-condenser 50 or separate vapor generator (not shown in FIG. 1) after generator-condenser 50. This cooling capacity can be utilized to support condensate (from flue gas) cooling, or for evaporative cooling of the bottoming cycle condenser. It can also be stored in a separate tank for organization of water-cooled condensation of the bottoming cycle that may stabilize the main power plant operation independently from the possible variations of ambient conditions.

Figure 2:
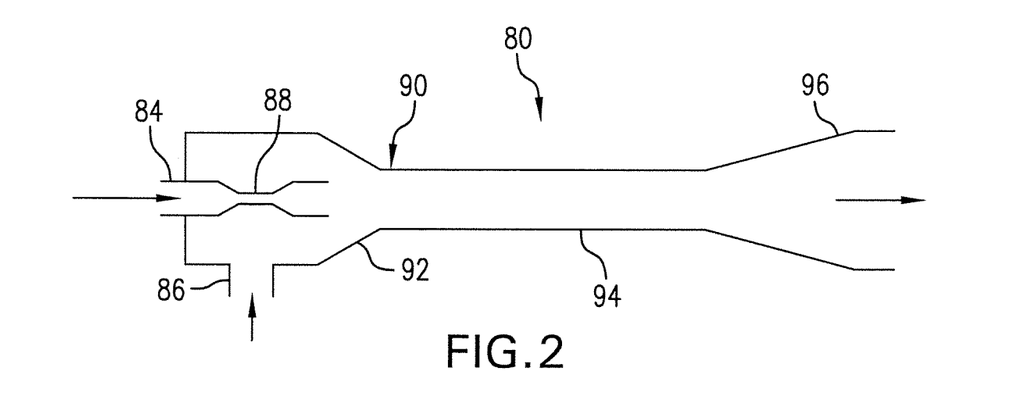
FIG. 2 representatively illustrates an ejector according to embodiment of this invention.

Exemplary ejectors for use in this invention include thermally driven technology that may use, for example, the Venturi effect to convert pressure energy of a fluid that flows into a converging-diverging nozzle to create a low pressure zone that entrains a suction fluid. FIG. 2 illustrates an exemplary ejector 80. A primary flow enters through primary nozzle inlet 84, and a secondary flow enters through secondary nozzle inlet 86 into or via a suction chamber. Passing through a throat 88 of the ejector 80, the fluid mixture expands and velocity decreases. The two flows mix in the mixing chamber 90 into a combined fluid. The mixing chamber includes a convergent mixing section 92 and a constant area mixing section (or "second throat" or cylindrical mixing section) 94. The combined fluid passes through the ejector diffuser 96. Energy from velocity is converted back into pressure energy. For simplicity the figures indicate just one ejector, however, in reality (e.g., for a typical 250-500 MW power plant) it would be necessary to have a set of several ejectors (each similar to the one that is illustrated in FIG. 2) to provide a required cooling load for exhaust condensing and co-generation.

The main advantages of ejectors are simplicity and reliability. The driving force is a sonic flow of a working fluid (steam or gas) that entrains a secondary fluid. Flow interactions lead to mixture stagnation that finally reaches the set pressure. Ejectors were initially used for air conditioning systems, vacuum devices, jet pumps, elevators, and stirring device in water heaters. Ejectors in the energy sector perform four main functions: steam or gas compression, vacuum pumps, vapor-liquid pumps, and expansion, replacing throttling valves. Ejector systems can be charged with binary and multicomponent mixtures of low-boiling fluids. This increases the energy characteristics of refrigeration/heat pump and cryogenic systems.

Figure 3:
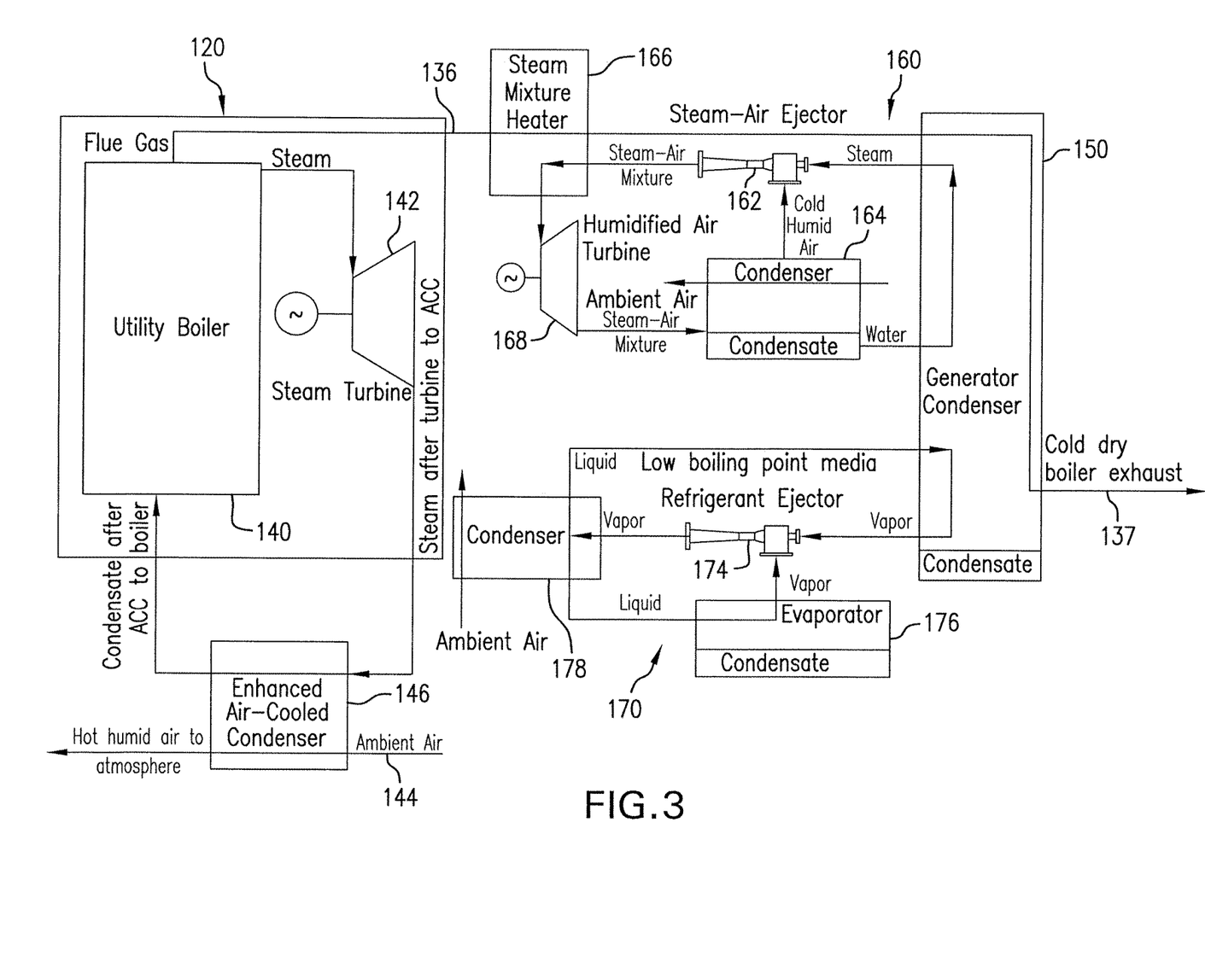
FIG. 3 is a flow diagram showing power plant cooling and/or heat recovery according to one embodiment of this invention.

FIG. 3 illustrates an exemplary layout according to one embodiment of this invention including a simple-cycle plant 120 that does not use a gas turbine. A boiler 140 powers steam turbine 142. The steam travels to condenser 146 where it is cooled by ambient air 144. The condensed water from the boiler exhaust 136 is supplied to an ACC fluid cycle 160 including set of ejectors 162, for both inlet air pre-cooling and thin-film evaporation over, for example, the micro/nano-structured ACC surfaces in condenser 164. The flue gas continues to the integrated steam generator-compressor 150, and released as cool dry boiler exhaust 137.

The modified Brayton cycle in the co-generation loop utilizes the air-steam mixture for the sub-atmospheric pressure compressed by ejector and increases the COP by 30-60% due to driving heat transfers for further use. In this case, the ejector serves as an "ideal compressor" in a designed pressure range, which does not consume useful turbine work unlike the mechanical compressor. For example, the ejector uses the pressure 0.7-1.0 bar while pressure after the turbine is 0.05-0.1 bar (ejector expansion ratio ~8-12). Performance of the ejector is thus expected to be very high. In addition, the turbine will be more productive at lower pressure operation.

In FIG. 3, the cooling processes in the ejector refrigerating system 170 includes a high pressure refrigerant in second cycle line 172, evaporated by flue gases in the generator-condenser 150, and expanded in the refrigerant ejector's nozzle 174. After expansion this refrigerant vapor entrains the vapors from evaporator 176, is compressed, and directed to condenser 178. The refrigerant condensate is split into two flows: one is throttled back to the evaporator 176 to produce cooling capacity at low-pressure evaporation, and the other is pumped to the generator-condenser 150 to evaporate at high pressure and temperature.

Figure 4:
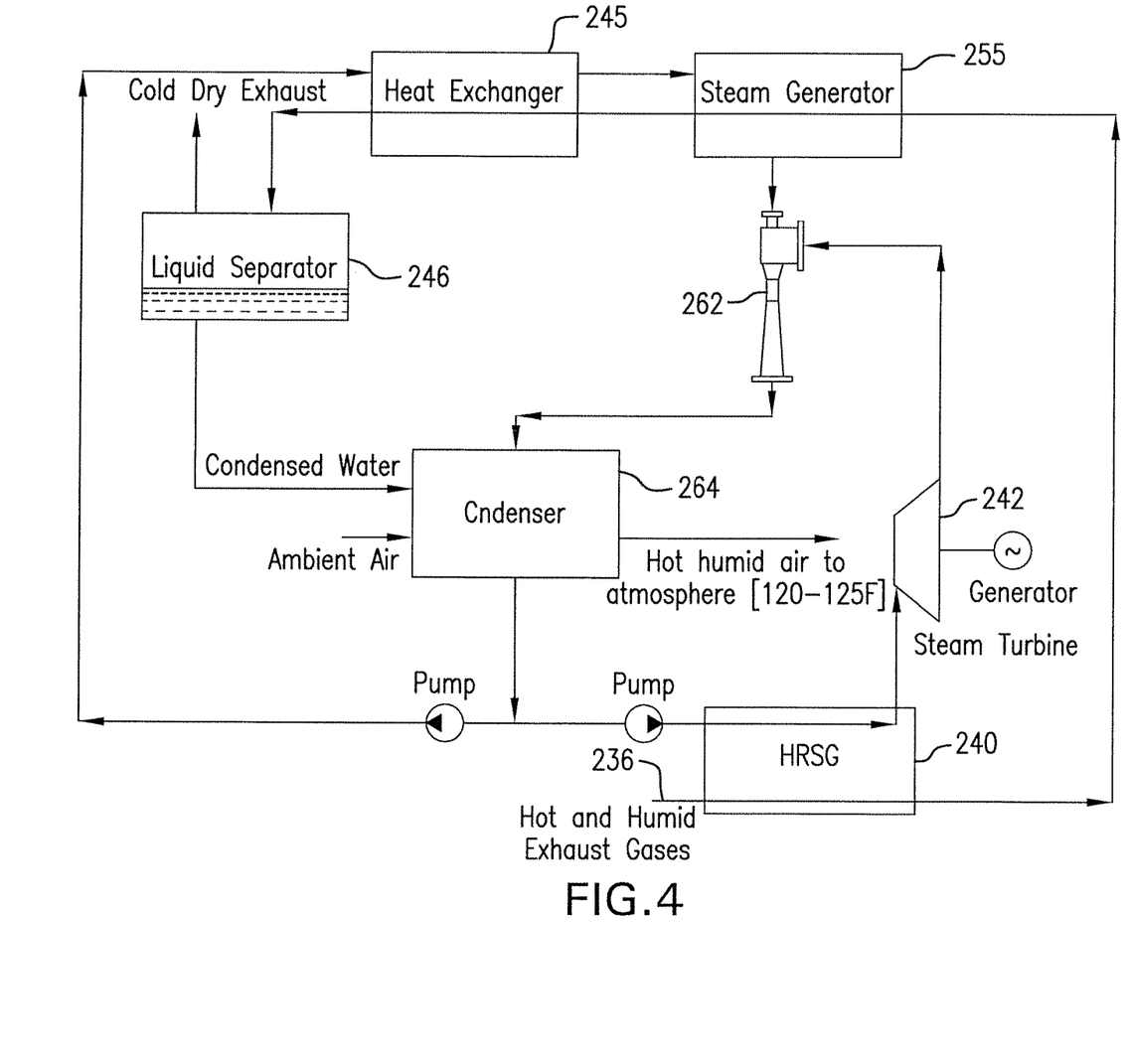
FIG. 4 is a flow diagram showing power plant cooling and/or heat recovery according to one embodiment of this invention.

FIG. 4 illustrates another embodiment of the present invention, including the use of exergy of the low-grade component of the heat of the combustion products 236 to increase the expansion ratio in the main Rankine cycle turbine 220. Such use can, for example, provide an additional approximately 0.5-0.8% of the rated power of the power plant depending on the parameters of the inlet flue gases. In FIG. 4, the expansion in the turbine 242 takes place at a lower pressure, and then the ejector 262 compresses the steam to a higher pressure and temperature at which the entire steam is condensed in condenser 264 at more favorable temperature range for condensation process. The condensation heat sink is conducted by air 244 with condensate injection from liquid separator 246.

Condensate is produced from the hot and humid exhaust gas by its cooling down to the temperatures corresponding to the dew point at a given exhaust gas humidity In some cases, such a system/method can be simpler, cheaper, and more efficient. The heat transfer rate reached in the system will allow the condensation of residual moisture from the exhaust gases, which can be accumulated at low ambient temperatures to increase the efficiency of the power cycle during peak periods when an increased flow rate of water is required for the air cooling. Referring to FIG. 4, The hot exhaust gases 236 provide steam from the condensate in heat recovery steam generator (HRSG) 240 to steam turbine 242. The condensate after the air-cooled condenser is further divided into two fluid flows, with the second fluid flow pumped to heat exchanger 245 and steam generator 255, each in further heat exchange combination with the exhaust gases 236, resulting in cool dry exhaust 237 from the liquid separator 246. Another fluid flow is pumped to HRSG to evaporate at high pressure and temperature before expansion in the steam turbine 242.

Figure 5:
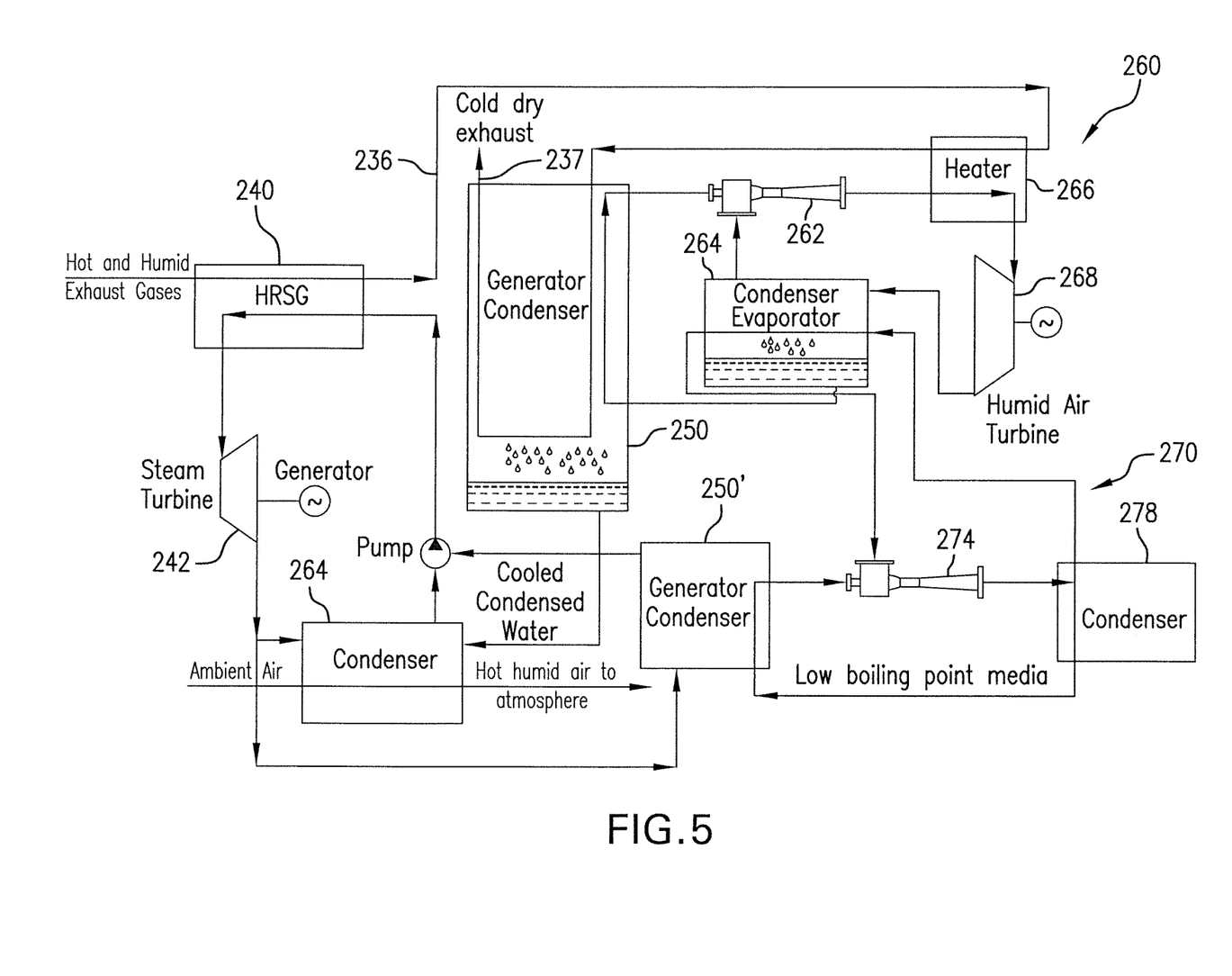
FIG. 5 is a flow diagram showing power plant cooling and/or heat recovery according to one embodiment of this invention.

When condensation heat is removed in the main Rankine cycle during peak periods, the condensation temperature exceeds 55-60° C., which makes it possible to carry out a refrigeration cycle, such as described above, and absorb this heat in the ERS vapor generator, while obtaining cold at the level of 15-20° C. FIG. 5 shows such as combination, wherein the exhaust gases 236 from the HRSG 240 are heated and delivered to a generator condenser 250. The generator-condenser 250 creates a high pressure steam in the fluid cycle line 260, which is then expanded in an ejector 262, which entrains a vapor-gas mixture from condenser-evaporator 264. The mixed fluid flows through the ejector's diffuser, where it is compressed and directed via a heater 266 (e.g., superheater) to a vapor-gas (humidified air) turbine 268. After the vapor-gas turbine 268, the expanded mixture is directed to the condenser-evaporator 264, where water vapor is condensed by the ambient or by the counterflow refrigerant evaporation at low temperature and pressure. In this case, the condenser-evaporator 264 is combined with a second fluid (namely refrigerant cycle line 272) including a second ejector 274. After expansion the refrigerant vapor entrains the vapors from condenser-evaporator 264, is compressed, and directed to condenser 278. The condensate is delivered to the generator-condenser 250 or, as shown, a second generator-condenser 250' combined into the line from condenser 264.

The embodiment of FIG. 5 can allow for extraction of additional condensate from the combustion products, while the condensation heat used to drive the turbo-ejector cycle. At the same time part of nearly saturated steam from Rankine turbine in condensed in the generator-condenser 250 of the ejector refrigeration cycles to produce cooling capacity either for condensation of moisture from the humidified air of the turbo-ejector cycle or for further condensation of moisture from the combustion products. Lowering the condensation temperature and pressure in the turbo-ejector cycle leads to an increase of its efficiency due to an increase of the turbine expansion ratio. In the refrigeration cycle, an increase in the ejector's entrainment ratio leads to an increase of the mass flow of condensed moisture from the combustion products. As a result, the capacity of the main power plant does not change or increase insignificantly, but the turbo-ejector cycle produces an additional of 2-5% to the main power plant capacity, while the amount of condensate increases by 3-5%, depending on the initial moisture content in the exhaust gasses.

Embodiments of this invention incorporate an efficient combination of heat and mass transfer modes to maximize the rate of convective heat transfer and phase change via evaporation, enabling dissipation of very large heat fluxes (in excess of 600 W/cm$^2$) at a surface temperature below 85° C., demonstrating heat transfer coefficients exceeding 0.1 MW/m$^2$K. This is at least two orders of magnitude enhancement in performance compared to the best convective air-cooling methods. To make this possible, a thin film of coolant (~15 mm) is maintained by capillary action over the heated surface using a thin (~10 mm) nanoporous membrane.

Enhanced dry cooling according to embodiments of this invention will bring a transformative decrease in water needed for power generation through an order of magnitude increase in the heat rejection capabilities at the condenser as well as a reduction in the total system cost from reduced condenser size and required air flow rate. The air flow pattern and velocity for evaporation-enhanced cooling may be modified compared with standard air-only cooling configurations to optimize performance for given pumping constraints.

A limited thermal performance and a large size of direct ACCs are defined by poor heat transfer mechanisms that can be achieved with forced convective air cooling. Even under most optimistic scenario the air-side transfer coefficient is approaching 250-300 W/m²K for realistic operating conditions, which results in excessive size and cost of ACCs. Embodiments of this invention incorporate two complimentary strategies. The first is a spray water into the incoming air to pre-cool it by water evaporation and second is to enhance the convective heat transfer at the ACC surfaces by air-assisted thin-film evaporation of water that is distributed over the heat exchange surfaces via a combination of capillary transport and uniform wetting micro/nano- structures. The capabilities of both approaches for dramatic enhancement of heat transfer have been experimentally and theoretically demonstrated (See Fedorov and Meacham, 2009; Narayanan, Fedorov, et al, 2013, herein incorporated by reference). Through optimized combination of these enhancement techniques, a 100 to 1,000-fold increase in the average heat transfer coefficient is expected, as compared to conventional air-cooling alone with respective reduction in the condenser surface area on the air side, which is a dominant contributor to the pressure penalty and capital cost. Among the additional key features are its ease of implementation (i.e., modification of commercially available ACCs) and scalability to a broad range of power dissipation levels, paving the way to power-efficient, low-cost thermal management system with high insertion potential into existing power plants.

Dramatic enhancement of heat transfer (>100 times) over the micro/nano-structured surfaces have been successfully demonstrated (See Fedorov and Meacham, 2009; Narayanan, Fedorov, et al, 2013). In addition, preliminary estimates indicated available waste heat from the utility boiler of 500 MW power plant could provide a co-generation possibility of about 15-50 MW depending on exhaust humidity. This should be enough to power the cooling system drives and controls.

EXAMPLES

Figure 6:
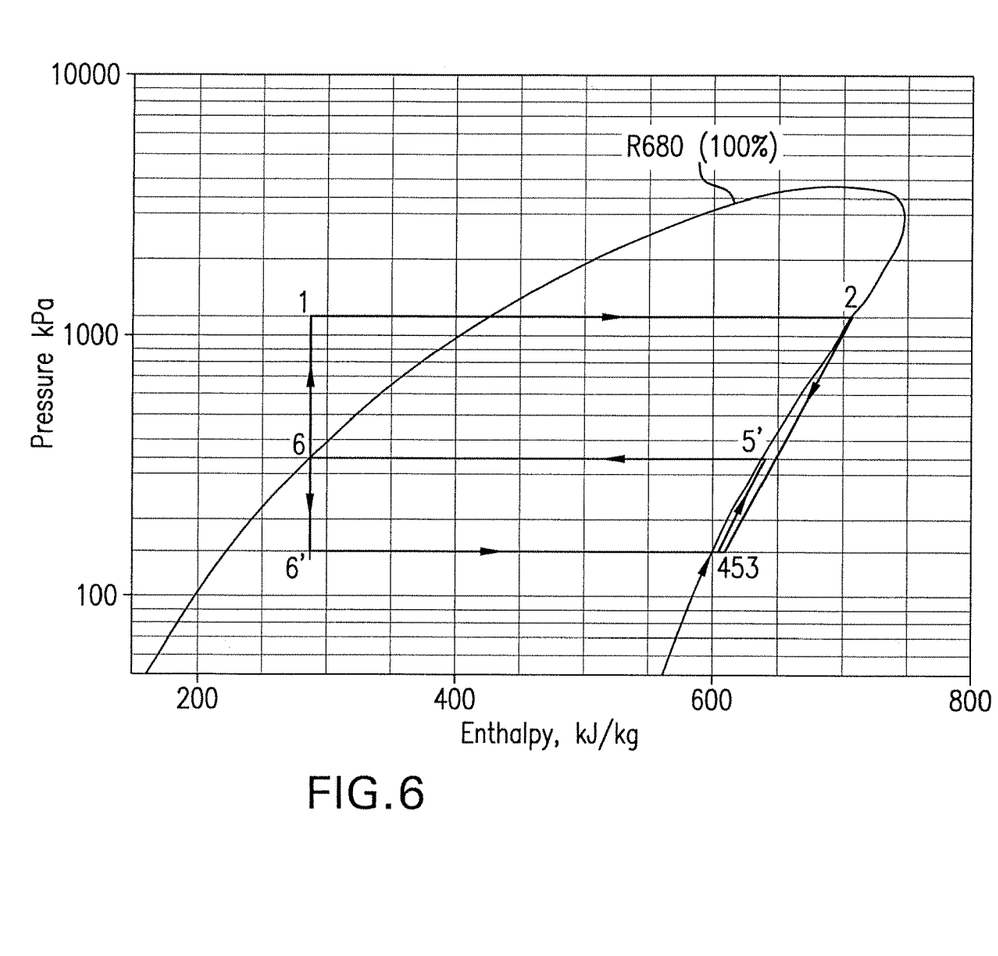
FIG. 6 shows a schematic diagram of an exemplary system and its thermodynamic cycle.

Like many heat driven cooling systems, Ejector Cooling Systems (ECS) simultaneously combine two thermodynamic cycles—power and refrigerating. Unlike the existed refrigeration cycles activated at the expense of mechanical work or electricity, they are produced in a separate cycle regardless of energy quality factor. FIG. 6 shows the schematic diagram of the ECS and its thermodynamic cycle. The heat from an external source is supplied to the vapor generator, where the working fluid is evaporating at high temperature and pressure. The working fluid heads to the ejector where it expands in the ejector nozzle and entrains the refrigerant vapor from the evaporator. The vapor mixture is compressed in diffuser part of the ejector and directs to the condenser, where it is condensing. The part of condensed fluid is throttled back to the evaporator, where its evaporating at low pressure and temperature, producing the valuable cooling. The balance of the condensed working fluid is directed by the thermal pump and feed the generator to repeat the cycle. The COP of ERS is determined by equation (1):

$$COP^{ERS} = \frac{Q_{eva}}{Q_{gen}} = \frac{q_{eva}G_{eva}}{q_{gen}G_{gen}} = U\frac{q_{eva}}{q_{gen}} \tag{1}$$

where: Qeva is cooling capacity, Qgen is heat consumed in the vapor generator, qeva,qgen are specific heat of evaporation, U is entrainment ratio, and Geva,Ggen are working fluid mass flow rates in the evaporator and the vapor generator. Eq. 1 does not count the pump work. If the system is equipped with the mechanical pump, COP of ERS will be essentially lower, taking into account the efficiency of the pump. An effective pump workload equals to 3-12% from total heat consumed.

However, considering the high electricity cost and its generation from the heat of same potential as used to activate the ERS's vapor generator, it reduces the system's COP by 2 times and even more. With thermal pump employed in the system, the COP decreases 3-12% maximum, depending on working media used (Eqs. 2-3).

$$COP^{ERS}_{thermopump} = \frac{Q_{eva}}{Q_{ejector} + Q_{thermopump}} = \tag{2}$$

$$\frac{q_{eva}G_{eva}}{q_{gen}G_{ejetor} + q_{gen}G_{thermopump}} = \frac{Uq_{eva}}{q_{gen}(1 + G_{thermopump}/G_{ejector})}$$

$$COP^{ERS}_{pump} = \frac{Q_{eva}}{Q_{ejector} + W_{pump}} = \frac{q_{eva}G_{eva}}{q_{gen}G_{ejetor} + q_{gen}G_{power}/\eta} = \tag{3}$$

$$\frac{q_{eva}G_{eva}}{q_{gen}G_{ejector}(1 + G_{power}/(G_{ejector}\eta))},$$

where:

$G_{thermopump}/G_{ejector} = 0.03 - 0.12$ $\eta = 0.1 - 0.13$

The turbo-ejector technology represents an innovative solution of power generation utilizing low or medium-grade heat sources. The technology is based on the well-known inverted Brayton cycle and operates at atmospheric or sub-atmospheric pressures. Such energetic systems are simple and reliable and utilize moisture-saturated air as a working fluid. However, the compressor as a driving unit of the system consumes the major part of the cycle's work, i.e., specific power output of the system decreases 50-60%. The ejector replacing the mechanical compressor in the Brayton cycle system does not consume any mechanical work produced in the turbine, instead allows increasing the cycle work by 3-5 times at the constant airflow. At the same time, the utilized heat serves for simultaneous heating and cooling production that makes the system economically viable and environmentally friendly with the increased integral performance. For system performance improvement, the schematic and the cycle were upgraded allowing the off-the-shelf components to be employed and replace the electrically driven fan with fluidic jet-fan that served for energy saving of the innovative turbo-ejector system operation. The traditional methods of power generation are related to the most aggressive environmental pollutions. Despite the high-grade heat required for its activation, the maximal achieved COP of such systems can hardly reach 50%. Due to the thermal stability of the materials employed, the temperature level is limited by 1650K.

The technologies are fossil fuels activated and related with toxic substances and greenhouse gasses emissions. Nuclear fuel has severe restriction, thus nuclear plants are considered as "high consequence facilities". Hydropower occupies insignificant share (15-20% only) in the world's energy mix due to the high depletion level of the rivers' potential, including runoff control leading to irreversible changes of ecosystem, i.e., blue-green algae and wood breakdown contamination, drowning of fertile lands, etc. Therefore, further spontaneous expansion of the traditional energy supply technologies can be disastrous and requires less harmful alternatives. The Brayton cycle combined with ejector can be an alternative power generation technology. Its special features are utilization of moisture-saturated warm air for power generation along with low-pressure in the system close to atmospheric, while turbine outlet pressure equals to 20-30 kPa. The system's working parameters make feasible to use less capacious and cheaper components, such as polymers. The combined cycle has 2-3-fold higher COP compared to the Rankine Cycle at driving temperatures in the range of 150-200° C. The steam-air ejector used in the Brayton Cycle consumes mid-grade heat instead of mechanical work increasing the cycle's work by 2-4 times and lowers the mass-dimensional characteristics of the whole power system.

Figure 7:
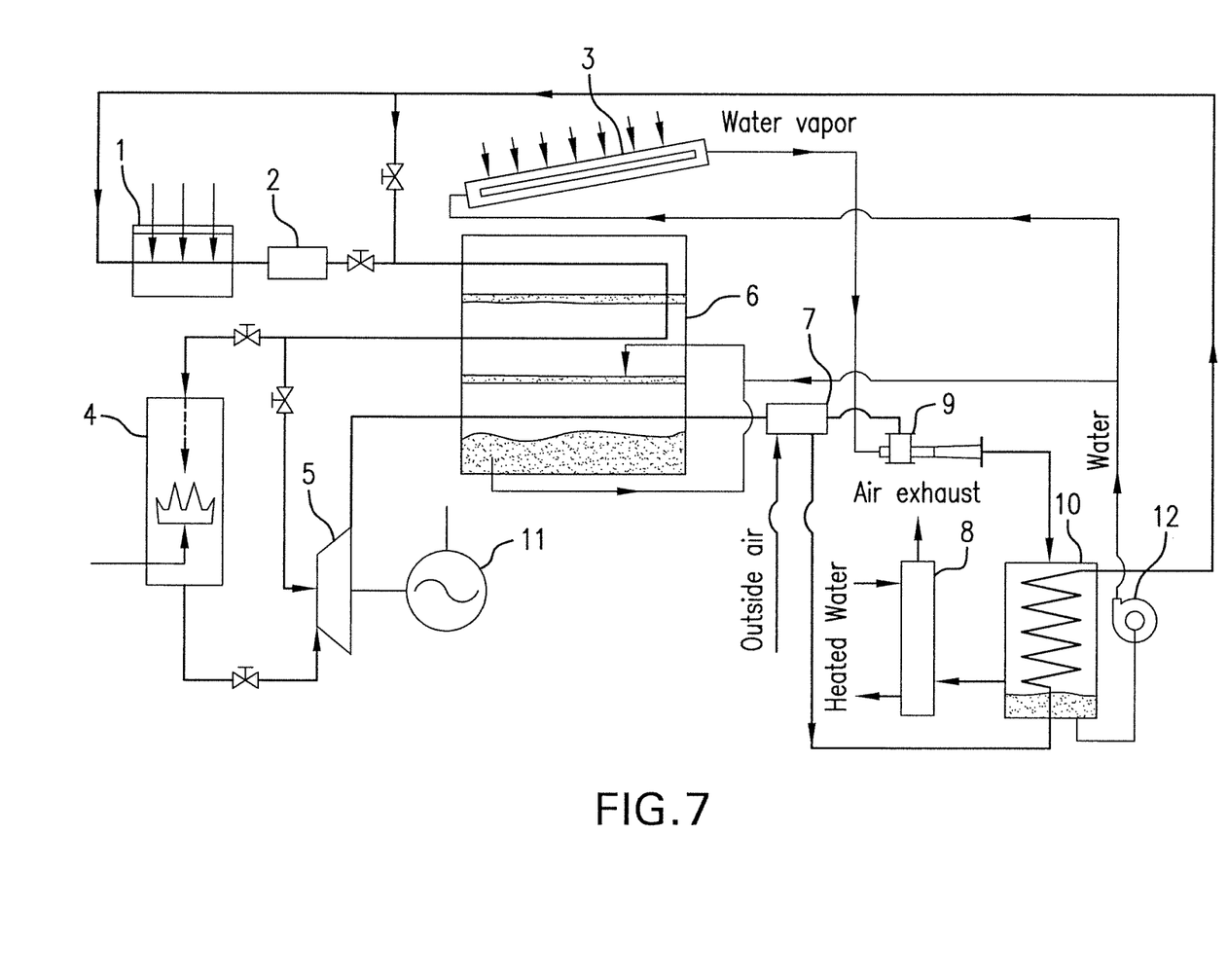
FIGS. 7 and 8 illustrate a schematic and a theoretical thermodynamic cycle of a system according to the examples herein.
Figure 8:
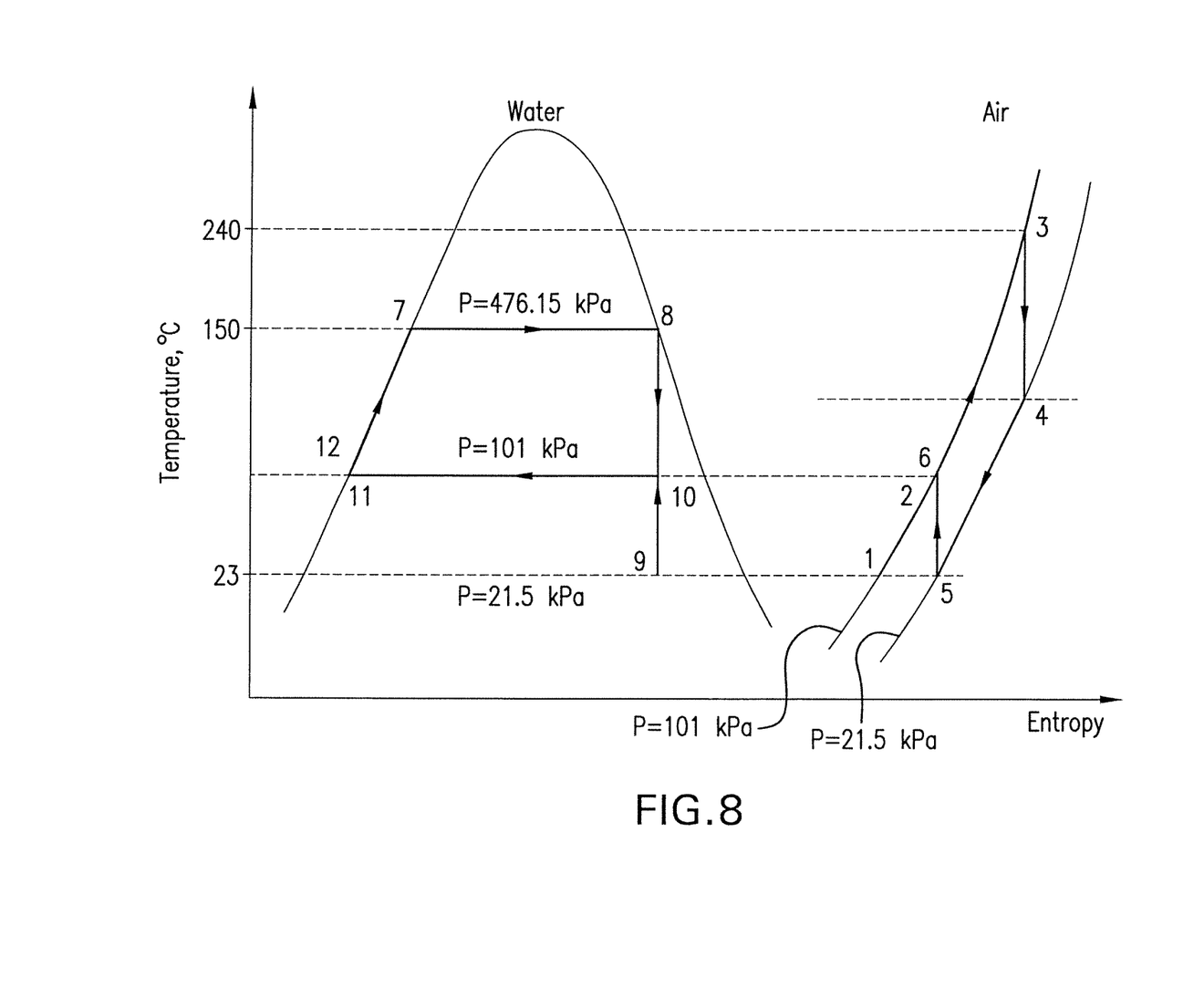

Turbo-ejector power generation systems involve heat and mass exchanger to perform heat recuperation and recovery. A schematic and a theoretical thermodynamic cycle of the system are presented in FIGS. 7 and 8, respectively. FIG. 7 shows a diagram of a turbo-ejector power system with HMX, where: 1 is a low-grade heat source; 2 is a heat storage; 3 is a solar thermal collector; 4 is a combustor; 5 is a turbine; 6 is a HMX (Heat and Mass Exchanger); 7 is a heat recuperator; 8 is an exhaust air heat recuperator; 9 is a steam-air ejector; 10 is a condenser/air recuperator; 11 is an electric generator; and 12 is a water pump. FIG. 8 shows a thermodynamic cycle of a Turbo-Ejector Power Cycle with HMX on a T-S diagram, where: 1-2 represents heat recuperation and air humidification in HMX; 2-3 represents humid air heating in the combustion chamber; 3-4 represents expansion in the turbine; 4-5 represents heat recovery in HMX; 7-8 represents water evaporation in solar collector; 8-9 represents expansion of steam-water in the ejector's nozzle; 9-10, 5-6 represents compression and steam-air mixing in ejector; 9-10-11 represents cooling and steam-water condensing; 11-12 represents condensed water supply to solar collector; and 12-7 represents water heating in solar collector.

For a comparative analysis, calculations using variable turbine COP from 0.75 to 0.95 were carried out. Two separate ways of calculation were considered: calculation using engineering method and using computer simulation of the system. The thermophysical properties of humid air were represented on additive basis using partial pressure of components, Eq. 4:

$$P = \sum_{i=1}^{n} p_i = p_1 + p_2 + \ldots + p_n$$

where P is a full pressure of gas mixture, kPa; p1-pn is a pressure of a component, kPa. Enthalpies of humid air were calculated using Eq. 5.

$$h_{humid\ air} = \frac{h_{steam}d + h_{dry\ air}}{d+1}$$

where $h_{humid\ air}$ is an enthalpy of humid air, kJ kg-1; $h_{steam}$ is a water steam enthalpy, kJ kg-1; d is absolute air humidity, kg kg-1, and $h_{dry\ air}$ is a dry air enthalpy, kJ kg-1.

The COP of turbo-ejector system was calculated accounting the entire turbine work is considered as a useful cycle work. However, the ejector operation requires a significant amount of low-grade heat, which is then returned to the system. In this case, efficiency mapping is performed correctly, since heat flows are adjusted to a single temperature level through the heat exergy:

$$COP_{SLPTE} = \frac{W_{turb}\eta_{turb} + E_{heat}}{Q_{comb} + Q_{steam}\frac{\eta_{Carnot,steam}}{\eta_{Carnot,comb}}}$$

where:

$$\eta_{Carnot,steam} = \frac{T_{gen} - T_{amb}}{T_{gen}}$$

$$\eta_{Carnot,comb} = \frac{T_{comb} - T_{amb}}{T_{comb}}$$

where Wturb is work produced in the turbine, kW; ηturb is a COP of the turbine; Eheat is a exergy of utilized heat, kW; Qcomb is heat consumed in the combustion chamber, kW; Qsteam is heat consumed for steam generation, kW; ηCarnot,steam is COP of Carnot cycle at steam generation and ambient temperature, ηCarnot,comb is COP of Carnot cycle at temperature out of combustion chamber and ambient temperature, Tgen is the steam generation temperature, K; Tcomb is the temperature of humid air out of combustion chamber, K; Tamb is the ambient air temperature, K.

Enthalpy after the ejector is:

$$h_{ej,out} = h_{steam}X_c + h_{air}(1 - X_c)$$

Entrainment ratio of the ejector was calculated using empirical data and verified using CFD-modelling of the ejector flow part. Empirical formula for the entrainment ratio used was:

$$U = \frac{K_1(a_{gen,crit}^{steam}/a_{cond,crit}^{humid\ air})\lambda_{gen,A} - K_3\lambda_{cond,C}}{K_4\lambda_{cond,C} - K_2(a_{eva,crit}^{air}/a_{cond,crit}^{humid\ air})\lambda_{gen,B}}$$

where, K1,K2,K3,K4 are integrated velocity coefficients; a is local sound speed, m s-1; λλ is reduced isentropic speed; crit is a critical parameter; A,B,C are nozzle outlet, cylindrical mixing chamber inlet and cylindrical mixing chamber outlet cross-section area, respectively.

Ways to further improve performance of the proposed thermal management scheme include (1) improving aerodynamic design of finned surface to ensure effective heat and mass transfer from evaporating water, (2) improving the pattern (direction) and properly matching the flow rates of air and liquid (droplets/film) to achieve complete evaporation over an entire area of the ACC and to avoid localized flooding or dry-out of the heat transfer surfaces, (3) defining an optimal size distribution and speed of ejected droplets, as well as the droplet delivery duty cycle in order to enable highly efficient evaporation with minimal convective heat and mass transfer resistance across the liquid film created by impinging droplets, and (4) a control system that provides on-demand turn on/off and adjust liquid droplet delivery to enable evaporation cooling locally in desired domains of the heat sink, which are seeing an increase in the dissipated power or surface temperature.

Thus the invention provides a cost-effective net-zero-water (NZW) consumption air cooling system for thermal power plant by employing the ACC or retrofitted from the traditional wet cooling tower. The preliminary estimate of the proposed concept indicated the benefits of such an approach for dry cooling. The utility boiler with efficiency of 90% generates enough waste heat to produce cooling capacity for condensing of its exhaust and co-generate about 40-50 MW of electricity to power ancillary equipment supporting the NZW system operation.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method for at least one of heat recovery and power plant cooling, comprising:
   providing a fluid cycle line in heat exchange combination with an exhaust flue gas, the fluid cycle line including an ejector within the fluid cycle line;
   mixing two fluid flows of the fluid cycle line into a combined fluid within the ejector, wherein the ejector adjusts at least one of a temperature or pressure of the combined fluid;
   condensing the combined fluid to provide a cooling medium; and
   directing the combined fluid to at least one of a heater or a turbine upstream of the condensing.

2. The method of claim 1, wherein the turbine is a steam turbine and further comprising generating power from the steam turbine in combination with the fluid cycle line.

3. The method of claim 1, further comprising:
   compressing the combined fluid with the ejector to at least one of a higher temperature or pressure;
   condensing the compressed fluid to obtain a condensate.

4. A method for at least one of heat recovery and power plant cooling, comprising:
   providing a fluid cycle line in heat exchange combination with an exhaust flue gas, the fluid cycle line including an ejector within the fluid cycle line;
   mixing two fluid flows of the fluid cycle line into a combined fluid within the ejector, wherein the ejector adjusts at least one of a temperature or pressure of the combined fluid;
   condensing the combined fluid to provide a cooling medium;
   dividing the cooling medium into a first flow and a second flow;
   generating a first vapor supply from the cooling medium of the first flow;
   generating a second vapor supply from the cooling medium of the second flow; and
   entraining the first vapor supply and the second vapor supply within the ejector.

5. The method of claim 4, further comprising:
   generating the first vapor supply via a heat recovery steam generator receiving exhaust gases; and
   directing the first vapor supply through a steam turbine disposed between the heat recovery steam generator and the ejector.

6. The method of claim 5, wherein the second flow of refrigerant condensate travels through at least one of a heat exchanger or a steam generator.

7. A method for at least one of heat recovery and power plant cooling, comprising:
   providing a fluid cycle line in heat exchange combination with an exhaust flue gas, the fluid cycle line including an ejector within the fluid cycle line;
   mixing two fluid flows of the fluid cycle line into a combined fluid within the ejector, wherein the ejector adjusts at least one of a temperature or pressure of the combined fluid;
   condensing the combined fluid to provide a cooling medium; and
   dividing the cooling medium into a first flow and a second flow in a heat exchanger in combination with a refrigerant cycle line.

8. The method of claim 1, further comprising directing the cooling medium to a generator-condenser receiving the exhaust flue gas.

9. The method of Claim 7, further comprising directing the combined fluid to at least one of a heater or a turbine upstream of the condensing.

10. A method for at least one of heat recovery and power plant cooling, comprising:
    providing a fluid cycle line in heat exchange combination with an exhaust flue gas, the fluid cycle line including an ejector within the fluid cycle line,
    mixing two fluid flows of the fluid cycle line into a combined fluid within the ejector, wherein the ejector adjusts at least one of a temperature or pressure of the combined fluid;
    condensing the combined fluid to provide a cooling medium
    providing a second ejector within a second refrigerant cycle line, wherein the fluid cycle line and the second refrigerant line extend through a shared condenser;
    mixing two refrigerant fluid flows of the second refrigerant cycle line into a combined refrigerant within the second ejector, wherein the second ejector adjusts at least one of a temperature or pressure of the combined refrigerant.

11. The method of claim 10, wherein the shared condenser is a generator-condenser or a condenser evaporator.

12. The method of claim 10, wherein the shared condenser lowers a temperature of a second refrigerant flow, and further comprising:
    entraining a vapor-gas mixture within the second ejector.

13. A method for at least one of heat recovery and power plant cooling, comprising:
    cooling combustion products having a temperature above ambient in a generator-condenser to generate a high-pressure vapor;

expanding the vapor in a nozzle of an ejector to entrain a mixture with a second vapor from a condenser or evaporator;

flowing the mixture through a diffuser of the ejector to compress; and heating and directing the mixture to a turbine, wherein the heated mixture powers condenser fans and water pumps.

14. The method of claim 13, wherein a power excess is directed to a local grid.

15. The method of claim 13, further comprising directing the mixture from the turbine to the condenser.

16. The method of claim 15, wherein water vapor is condensed and cooled to a temperature below the ambient.

17. The method of claim 13, wherein the cooling comprises:

at least one of heating or evaporating the vapor in the generator-condenser;

entraining the vapor and the second vapor in an entrained mixture;

compressing the entrained mixture and directing the compressed entrained mixture to a condenser to obtain a refrigerant condensate.

18. A method for at least one of heat recovery and power plant cooling, comprising:

cooling combustion products having a temperature above ambient in a generator-condenser to generate a high-pressure vapor, wherein the cooling comprises:

at least one of heating or evaporating a second vapor in the generator-condenser;

entraining the second vapor with a further vapor in an entrained mixture;

compressing the entrained mixture and directing the compressed entrained mixture to a condenser to obtain a refrigerant condensate; and dividing the refrigerant condensate into a first flow and a second flow, wherein the first flow is directed to the evaporator and the second flow is directed to the generator-condenser, expanding the high-pressure vapor in a nozzle of an ejector to entrain a mixture with a third vapor from a condenser or evaporator;

flowing the mixture through a diffuser of the ejector to compress; and heating and directing the mixture to a turbine.

19. The method of claim 17, further comprising directing the entrained mixture through a steam turbine disposed between a heat recovery steam generator and the ejector.

20. A system for at least one of heat recovery and power plant cooling, comprising:

a vapor generator configured to receive combustion products; and a first ejector configured to transfer vapor from the generator to a first condenser, wherein the first ejector comprises a converging-diverging nozzle to create a low pressure zone that entrains a fluid; and a cooling cycle line in combination with the vapor generator, and including a second ejector configured to transfer a second fluid from the vapor generator to a second condenser.

21. The system of claim 20, further comprising a turbine downstream of the first ejector.

22. The method of claim 4, further comprising directing the first flow of the cooling medium to a generator-condenser receiving the exhaust flue gas.

* * * * *